(12) United States Patent
Nakano et al.

(10) Patent No.: US 10,948,083 B2
(45) Date of Patent: Mar. 16, 2021

(54) GASKET-MOUNTING STRUCTURE AND GASKET

(71) Applicant: NIPPON PILLAR PACKING CO., LTD., Osaka (JP)

(72) Inventors: Atsushi Nakano, Osaka (JP);
Tomoyuki Koike, Osaka (JP);
Tomohiro Adachi, Osaka (JP);
Kazukiyo Teshima, Osaka (JP);
Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 22 days.

(21) Appl. No.: 16/400,056

(22) Filed: May 1, 2019

(65) Prior Publication Data

US 2019/0368611 A1 Dec. 5, 2019

(30) Foreign Application Priority Data

Jun. 1, 2018 (JP) ................................. 2018-106380

(51) Int. Cl.
*F16J 15/02* (2006.01)
*F16J 15/10* (2006.01)
*F16L 23/22* (2006.01)

(52) U.S. Cl.
CPC ........... *F16J 15/104* (2013.01); *F16J 15/102* (2013.01); *F16L 23/22* (2013.01)

(58) Field of Classification Search
CPC .......... F16J 15/102; F16J 15/104; F16L 23/22
See application file for complete search history.

(56) References Cited

U.S. PATENT DOCUMENTS

| 4,410,186 | A | * | 10/1983 | Pierce, Jr. | ............... | F16L 23/20 |
| | | | | | | 277/318 |
| 5,431,417 | A | * | 7/1995 | Dahlgren | ................ | F16L 23/20 |
| | | | | | | 277/614 |
| 5,433,454 | A | * | 7/1995 | Ramberg | ............... | F16J 15/062 |
| | | | | | | 277/614 |
| 2015/0176744 | A1 | * | 6/2015 | Glassman | .............. | F16J 15/002 |
| | | | | | | 277/609 |

FOREIGN PATENT DOCUMENTS

JP      2006-153180      6/2006

\* cited by examiner

*Primary Examiner* — Gilbert Y Lee

(74) *Attorney, Agent, or Firm* — Oblon, McClelland, Maier & Neustadt, L.L.P.

(57) ABSTRACT

A structure allowing a gasket to be mounted on a fluid device is provided. The gasket includes an annular attaching portion that has a first slope at an axial end. The fluid device includes an annular attached portion with a second slope that contacts the first slope. The first slope at least partially includes a contact area that contacts the second slope to seal a gap between the first slope and the second slope. The contact area has an annular bulge protruding toward the second slope in contrast to other portions of the first slope so that the bulge is the earliest contact portion with the second slope when the contact area is brought into contact with the second slope.

3 Claims, 12 Drawing Sheets

GASKET-MOUNTING STRUCTURE AND GASKET

TECHNICAL FIELD

The invention relates to gasket-mounting structures and gaskets.

BACKGROUND ART

A gasket-mounting structure is known, which is disclosed in JP 2006-153180 A, for example. The structure allows a gasket to be mounted on a first flange pipe and to seal the gap between the gasket and the flange pipe. While the first flange pipe has a reverse-tapered face at the inner periphery of the tip of its first connection end, the gasket has a tapered face at the outer periphery of the tip of its second connection end. The reverse-tapered face contacts the tapered face. The gasket-mounting structure allows the reverse-tapered face of the first flange pipe and the tapered face of the gasket to be tightly pressed against each other when the gasket is being mounted on the first flange pipe. Thus, a sealing area is provided between the reverse-tapered face and the tapered face.

SUMMARY OF THE INVENTION

In each conventional gasket-mounting structure, the reverse-tapered face of a fluid device and the tapered face of a gasket are planes parallel to each other; the profiles in their vertical cross sections are parallel lines. The parallel planes are pressed against each other to form a sealing area. Accordingly, the gasket-mounting structure needs an external force properly exerted on the gasket, which results in pressure that the entirety of the reverse-tapered face of the fluid device receives from the entirety of the tapered face of the gasket. Surely forming the sealing area requires carefully mounting the gasket on the fluid device to allow the reverse-tapered face of the fluid device and the tapered face of the gasket to be tightly pressed against each other.

To solve the above-described problems, the invention is provided. An object of the invention is to facilitate mounting a gasket on a fluid device to seal the gap between the gasket and the fluid device.

According to a first aspect of the invention, a structure allows a gasket to be mounted on a fluid device. The gasket includes an annular attaching portion that has a first slope at an axial end. The fluid device includes an annular attached portion with a second slope that contacts the first slope. The first slope at least partially includes a contact area that contacts the second slope to seal a gap between the first slope and the second slope. The contact area has an annular bulge protruding toward the second slope in contrast to other portions of the first slope so that the bulge is the earliest contact portion with the second slope when the contact area is brought into contact with the second slope.

According to a second aspect of the invention, a structure allows a gasket to be mounted on a fluid device. The gasket includes an annular attaching portion that has a first slope at an axial end. The fluid device includes an annular attached portion with a second slope that contacts the first slope. The second slope at least partially includes a contact area that contacts the first slope to seal a gap between the first slope and the second slope. The contact area has an annular bulge protruding toward the first slope in contrast to other portions of the second slope so that the bulge is the earliest contact portion with the first slope when the contact area is brought into contact with the first slope.

According to a third aspect of the invention, a gasket is to be mounted on a fluid device. The gasket includes an annular attaching portion with a first slope at an axial end. The first slope contacts a second slope of the fluid device. The first slope at least partially includes a contact area that contacts the second slope to seal a gap between the first slope and the second slope. The contact area has an annular bulge protruding toward the second slope in contrast to other portions of the first slope so that the bulge is the earliest contact portion with the second slope when the contact area is brought into contact with the second slope.

DESCRIPTION OF THE EMBODIMENTS

A First Embodiment of the Invention

As shown in FIGS. 1-4, a gasket-mounting structure according to the first embodiment of the invention is used to mount a gasket 1 on a first fluid device 3. The structure is also used to mount the gasket 1 on a second fluid device 5. The structure connects the first fluid device 3 to the second fluid device 5. One of the fluid devices 3 and 5 is located at an upper portion of the flow of fluid, and the other is at a lower portion of the flow. The gasket 1 is placed between the fluid devices 3 and 5. Note that the fluid devices 3 and 5 on which the gasket 1 is mounted are devices relating to fluid that include, but are not limited to, integrated panels, valves, pumps, accumulators, fluid reservoirs, heat exchangers, regulators, pressure gauges, flowmeters, heaters, and flange pipes.

Figure 3:
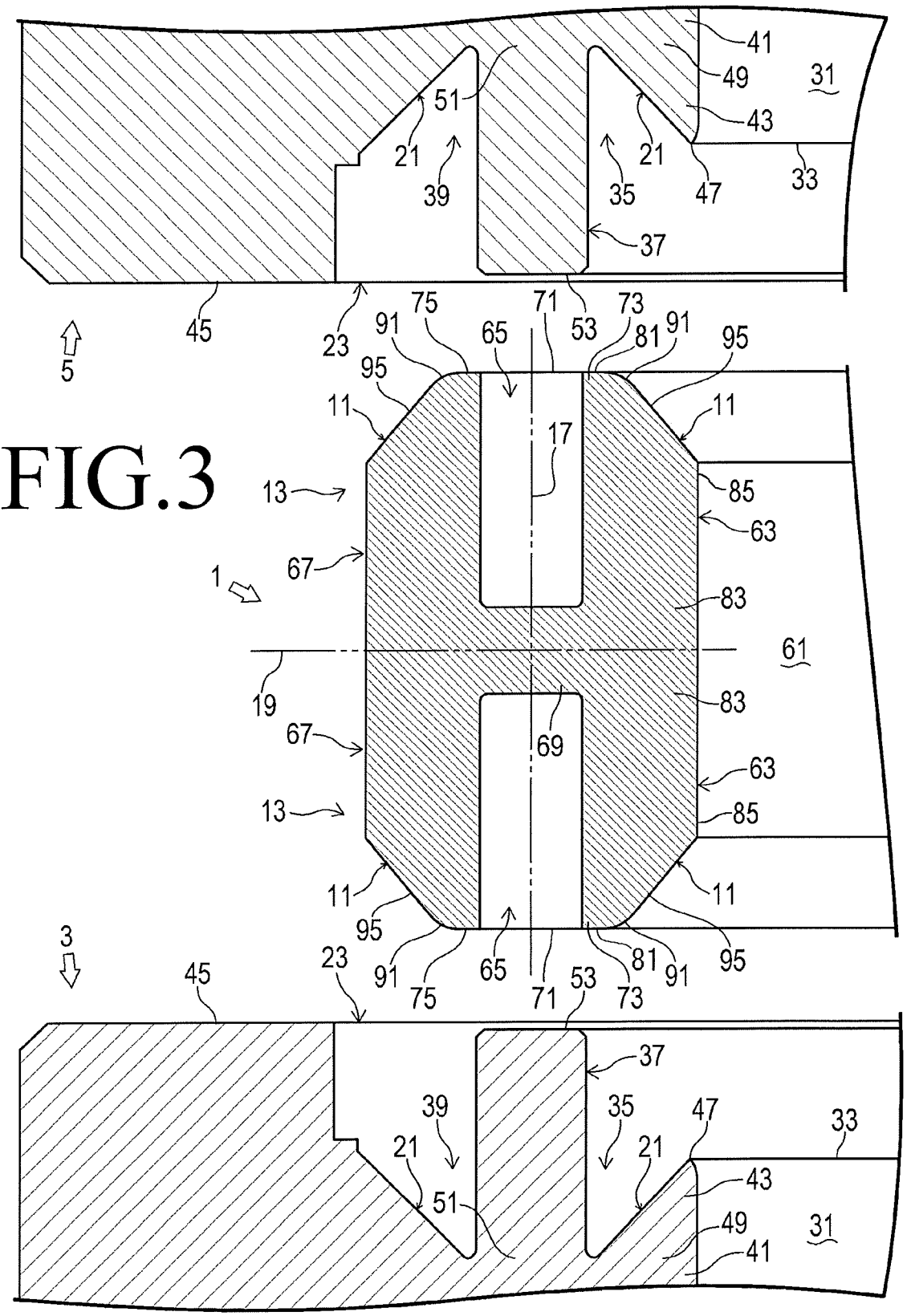
FIG. 3 is an exploded view of the gasket-mounting structure of FIG. 2.

The gasket 1 is a ring with a constant inner diameter. The gasket 1 includes an annular attaching portion 13 at a first axial end and another attaching portion 13 at a second axial end. Each attaching portion 13 has a first slope 11 at an axial end. A cross section of the gasket 1 that includes the axis 15 of the gasket 1 is symmetric with respect to the axis 15. The annular portion of the gasket 1 that defines the hole of the gasket 1 has an H-shaped cross section, on which the shapes of the attaching portions 13 are based. As shown in FIG. 3, the H-shaped cross section is symmetric with respect to a first virtual line 17 parallel to the axis 15 of the gasket 1 and passing through the radial center of the H-shaped cross section. The H-shaped cross section is also symmetric with respect to a second virtual line 19 perpendicular with the first virtual line 17.

Instead of the ring including the annular portion with the H-shaped cross section, the gasket 1 may be a ring including another annular portion that has the attaching portion(s) 13 inside one or both of the axial ends of the gasket 1, i.e. on a side of the axial end(s) facing a fluid channel 61 described later.

The first fluid device 3 includes an annular attached portion 23 with a second slope 21 that contacts the first slope 11. The second fluid device 5 also includes an annular attached portion 23 with a second slope 21 that contacts another first slope 11. The attached portion 23 of the first fluid device 3 is located below the attached portion 23 of the second fluid device 5. The attached portions 23 are adjacent to each other and arranged coaxially to face each other across the gasket 1.

The structure allowing the first axial side (the downside in FIG. 1) of the gasket 1 to be mounted on the first fluid device 3 is equivalent to the structure allowing the second axial side (upside) of the gasket 1 to be mounted on the second fluid device 5. Thus, the following will mainly explain the structure at the first fluid device 3.

Figure 1:
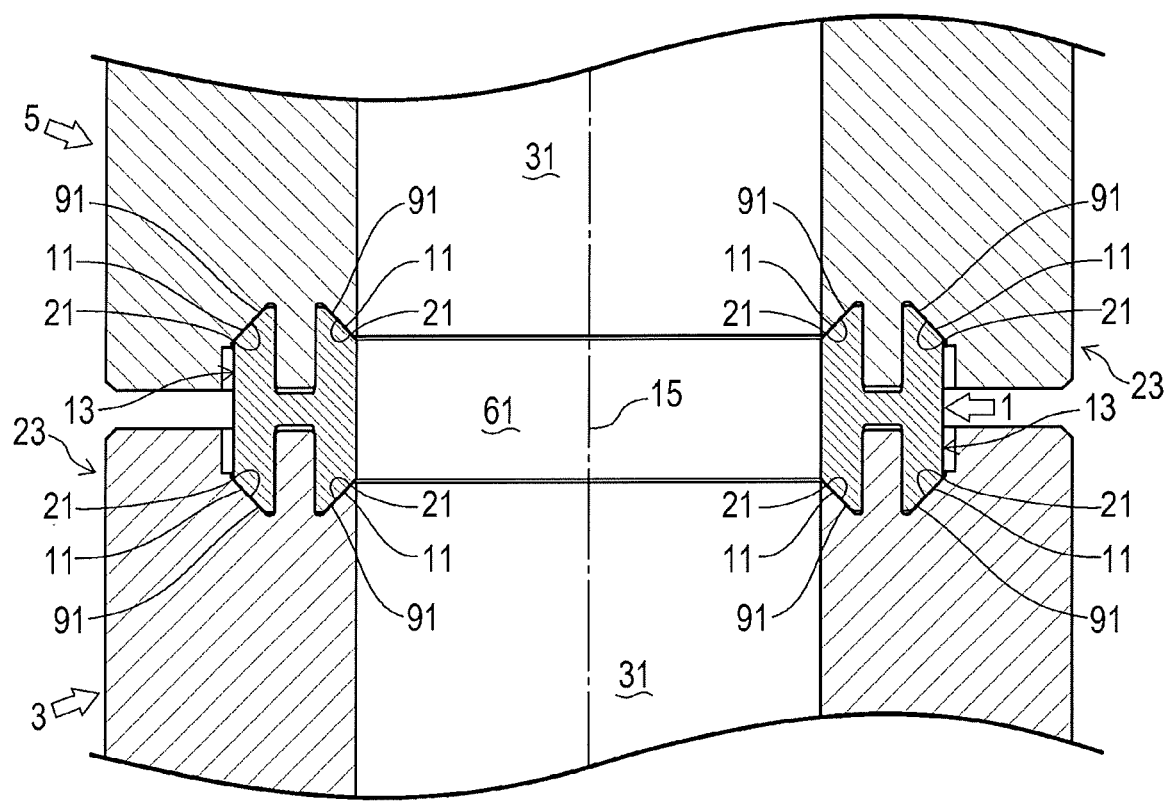
FIG. 1 is a cross-section view of a gasket-mounting structure according to a first embodiment of the invention.
Figure 2:
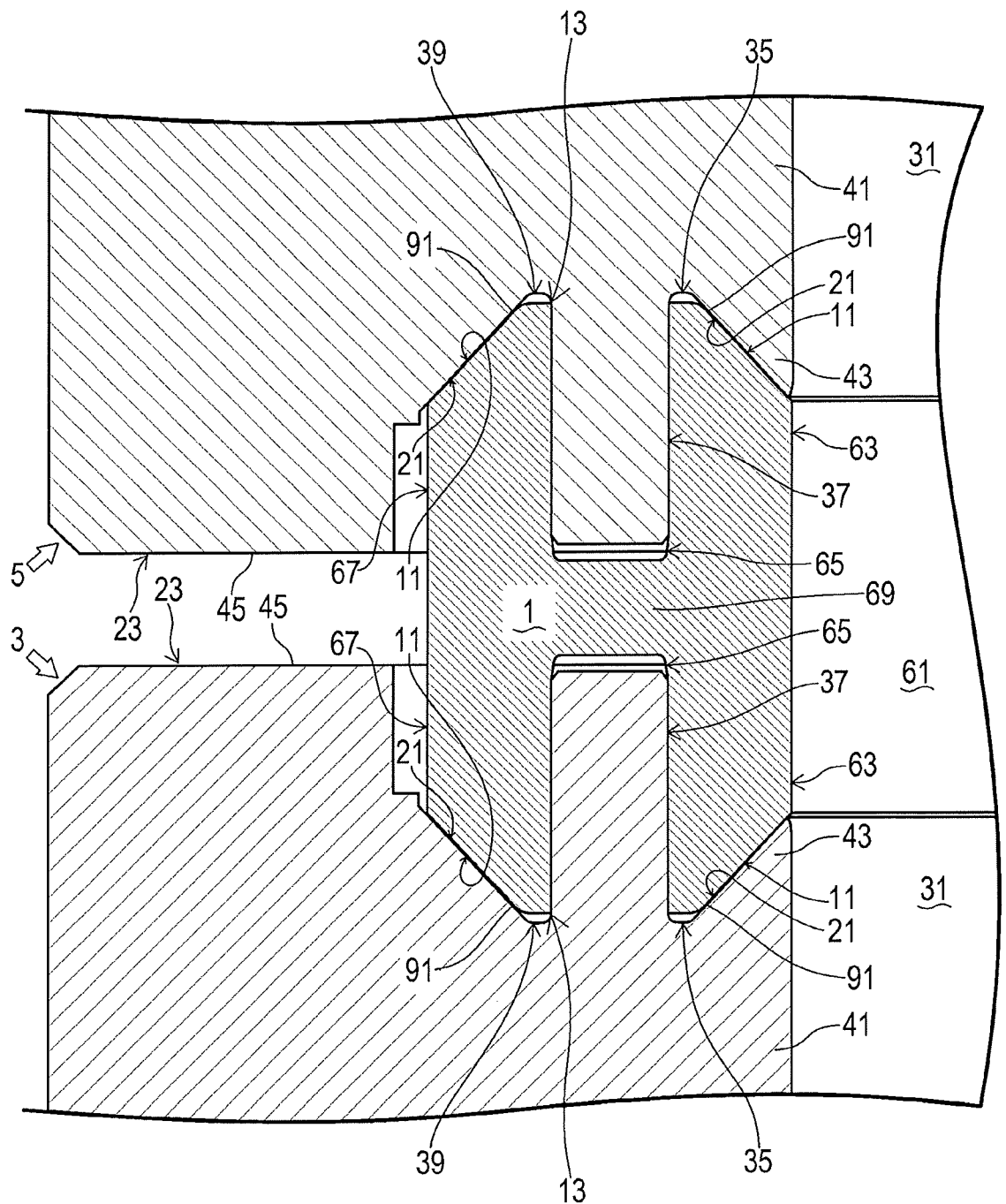
FIG. 2 is a partially enlarged cross-section view of the gasket-mounting structure of FIG. 1.

The attached portion 23 of the first fluid device 3 is placed at a second axial end of the first fluid device 3, its upper end in FIG. 1. The attached portion 23 encloses a first fluid channel 31, which has a circular cross section and extends along the axis of the gasket 1 mounted on the first fluid device 3, i.e. in a vertical direction in FIG. 1. The first fluid channel 31 is a hole, i.e. an inner space, of the annular attached portion 23. The first fluid channel 31 is open towards the gasket 1, upwards in FIG. 1. The opening 33 of the first fluid channel 31 is placed lower than a second axial (upper) end 45 of the attached portion 23.

The attached portion 23 is made from certain thermoplastic resin, which include, for example, fluoropolymer such as perfluoroalkoxy alkane (PFA) and polytetrafluoroethylene (PTFE). Alternatively, the fluoropolymer may be polychlorotrifluoroethylene (PCTFE) or ethylene-tetrafluoroethylene copolymer (ETFE). As usage, the attached portion 23 may be made from polypropylene (PP), high-density polyethylene (HDPE), low-density polyethylene (LDPE), or polyoxymethylene (POM).

The attached portion 23 includes an annular inner concave 35, an annular convex 37, and an annular outer concave 39 to contact the attaching portion 13 of the gasket 1 when the gasket 1 is mounted on the first fluid device 3. The opening 33 of the first fluid channel 31 is surrounded by the inner concave 35, which is surrounded by the convex 37, which is surrounded by the outer concave 39. The inner concave 35, the convex 37, and the outer concave 39 extend in the axial direction (the vertical direction in FIG. 2), along which the gasket 1 approaches the first fluid device 3 when the gasket 1 is being mounted on the first fluid device 3. The inner concave 35, the convex 37, and the outer concave 39 are coaxial with each other and the first fluid channel 31.

The inner concave 35 has a shape that fits an inner protrusion 63 of the gasket 1, which will be described later. The inner concave 35 is open toward the gasket 1 (upward in FIG. 2) and extends around the opening 33 of the first fluid channel 31 in a circumferential direction of the attached portion 23.

The convex 37 has a shape that fits a groove 65 of the gasket 1, which will be described later. The convex 37 protrudes from the body 41 of the first fluid device 3 toward the gasket 1 (upward in FIG. 2) and extends around the inner concave 35 in a circumferential direction of the attached portion 23.

The outer concave 39 has a shape that fits an outer protrusion 67 of the gasket 1, which will be described later. The outer concave 39 is open toward the gasket 1 (upward in FIG. 2) and extends around the convex 37 in a circumferential direction of the attached portion 23.

In a radial direction of the attached portion 23, a protrusion 43 is located between the opening 33 of the first fluid channel 31 and the convex 37. The protrusion 43 extends from the body 41 of the first fluid device 3 toward the gasket 1 (upward in FIG. 2). The protrusion 43 also extends in a circumferential direction of the attached portion 23 around the opening 33 of the first fluid device 31. The protrusion 43 has an annular shape with a constant inner diameter and tapers toward a first axial (upper) end surface 45 of the attached portion 23. The protrusion 43, together with the convex 37, forms the inner concave 35. The shape of the protrusion 43 reduces a cross-section area of the inner concave 35 with increase in distance from the opening of the inner concave 35. As described later, the protrusion 43 has an outer periphery 101 with the annular second slope 21 and an inner periphery 103 facing the first fluid channel 31.

The second slope 21 has a first portion near the tip end 47 (upper end in FIG. 3) of the protrusion 43 and a second portion near the base (lower) end 49 of it. Since the inner concave 35 has the above-described shape, the first portion is located at a distance from the convex 37 in a radial direction of the attached portion 23, and the second portion is connected to the base end 51 of the convex 37. The first portion of the second slope 21 is located radially inside the second portion of it. The second slope 21 is thus inclined to increase its radius with increase in distance from the tip (upper) end 47 of the protrusion 43.

The inner concave 35 and the outer concave 39 are symmetric with respect to the convex 37. Like the inner concave 35 defined by the convex 37 and the second slope 21, the outer concave 39 is defined by the convex 37 and another second slope 21.

The convex 37 is lower than the second axial (upper) end surface 45 of the attached portion 23. To be exact, the tip end 53 of the convex 37 is located in an axial direction of the attached portion 23 nearer to the body 41 of the first fluid device 3 than the second axial end surface 45 of the attached portion 23.

The gasket 1 is made from certain thermoplastic resin, which includes for example, fluoropolymer such as PFA and PTFE. Alternatively, the fluoropolymer may be PCTFE or ETFE. As usage, the gasket 1 may be made from PP, HDPE, LDPE, or POM.

The gasket 1 encloses a second fluid channel 61, which is a through hole in an axial direction of the annular body of the gasket 1. The second fluid channel 61 has a circular cross section perpendicular to the axial direction, a vertical direction in FIG. 1, and extends in the axial direction. The second fluid channel 61 has a constant diameter, which corresponds to the inner diameter of the gasket 1 and equals the diameter of the first fluid channel 31, which corresponds to the inner diameter of the attached portion 23. The second fluid channel 61 is coaxial with the first fluid channel 31. The second fluid channel 61 is open toward the first fluid device 3 (downward in FIG. 1) at the first axial end (lower end in FIG.

1) of (the attaching portion 13 of) the gasket 1. Through the opening, the second fluid channel 61 is connected to the first fluid channel 31.

The attaching portion 13 on the first axial side of the gasket 1 includes an annular inner protrusion 63, an annular groove 65, and an annular outer protrusion 67, which are mounted on the attached portion 23 of the first fluid device 3. The inner protrusion 63, the groove 65, and the outer protrusion 67 extend in an axial direction of the gasket 1 (a vertical direction in FIG. 1). The second fluid channel 61 is surrounded by the inner protrusion 63, which is surrounded by the groove 65, which is surrounded by the outer protrusion 67. The inner protrusion 63, the groove 65, and the outer protrusion 67 are coaxial with each other and the second fluid channel 61.

The inner protrusion 63 protrudes from the axial center 69 of the gasket 1 toward the first axial direction (downward in FIG. 2) and extends around the second fluid channel 61 in a circumferential direction of the attaching portion 13. The inner protrusion 63 has a shape that fits the inner concave 35 of the first fluid device 3.

The groove 65 is defined by the inner protrusion 63, the outer protrusion 67, and the axial center 69 of the gasket 1. The groove 65 is open toward the first axial direction of the gasket 1 (downward in FIG. 2) and extends around the inner protrusion 63 in a circumferential direction of the attaching portion 13. The opening 71 of the groove 65 is located at the same axial position as the tip end 73 of the inner protrusion 63 and the tip end 75 of the outer protrusion 67. The groove 65 has a shape that fits the convex 37 of the first fluid device 3. When the attaching portion 13 is mounted on the attached portion 23, the groove 65 engages with the convex 37 and the inner periphery of the groove 65 is pressed against the convex 37.

The outer protrusion 67 protrudes from the axial center 69 of the gasket 1 toward the first axial direction (downward in FIG. 2) and extends around the groove 65 in a circumferential direction of the attaching portion 13. The outer protrusion 67 has a shape that fits the outer concave 39 of the first fluid device 3.

The inner protrusion 63 has a portion near the tip end 73, i.e. a lower portion in FIG. 3. The portion tapers toward the tip end surface 81, i.e. the lower end surface in FIG. 3. The portion include an inner periphery with the first slope 11 and an outer periphery facing the groove 65.

The first slope 11 has an annular shape that extends throughout the inner periphery of the gasket 1. The first slope 11 has a first area near the tip (lower) end 73 of the inner protrusion 63 and a second area near the base (upper) end 83 of it. The first area is continuously connected to the tip end surface 81 at the tip end 73 of the inner protrusion 63. The second area is continuously connected to the inner circumferential surface 85 of the inner protrusion 63. The first (lower) area of the first slope 11 is located radially outside the second (upper) area of it. The first slope 11 is thus inclined with respect to the axis 15 of the gasket 1 to increase its radius with increase in distance from the base (upper) end 83 of the inner protrusion 63. Due to the first slope 11, the (lower) portion of the inner protrusion 63 near the tip (lower) end 73 has parts closer to the tip end 73 with larger inner diameters. The first slope 11 can contact and press the whole periphery of the annular second slope 21, which is inclined with respect to the axis of the attached portion 23. Note that the axis of the attached portion 23 and the axis 15 of (the attaching portion 13 of) the gasket 1 are colinear with each other. When the attaching portion 13 is mounted on the attached portion 23, the first slope 11 at least partially contacts the second slope 21 to seal the gap between the first slope 11 and the second slope 21.

At least a part of the first slope 11 includes an annular bulge 91. For example, the bulge 91 is located near the tip end 73 of the inner protrusion 63 of the first slope 11, i.e. on the first axial side (downside) of (the inner protrusion 63 of) the attaching portion 13 and at the outer periphery of the first slope 11. Due to the bulge 91, the first slope 11 has a (rounded) shape convex to the second slope 21. The bulge 91 extends within the first slope 11 in a circumferential direction of (the inner protrusion 63 of) the attaching portion 13. In contrast to the other parts 95 of the first slope 11, the bulge 91 protrudes toward the first axial direction of (the inner protrusion 63 of) the attaching portion 13 (i.e. downward in FIG. 3) and inward in a radial direction of the attaching portion 13. When the first slope 11 is brought into contact with the second slope 21, the bulge 91 is closer to the second slope 21 than other parts 95 of the first slope 11 so that the peak 93 of the bulge 91 is the earliest contact portion with the second slope 21. The bulge 91 is a single continuous area in the first slope 11. Alternatively, the bulge 91 may be two or more discrete areas in the first slope 11.

The inner protrusion 63 and the outer protrusion 67 are symmetric with respect to the groove 65. The outer protrusion 67 is symmetric with respect to the second virtual line 19 (cf. FIG. 3). In the figures, components of the outer protrusion 67 are marked by the same reference numbers as symmetric components of the inner protrusion 63. Description on the components of the outer protrusion 67 can be found in description on the symmetric components of the inner protrusion 63.

When the gasket 1 is being mounted on the first fluid device 3, i.e. it is being changed from the position separated from the first fluid device 3 (cf. FIGS. 3 and 4) to the position mounted on it (cf. FIGS. 1 and 2), the attaching portion 13 on the first axial side (downside) of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Figure 5:
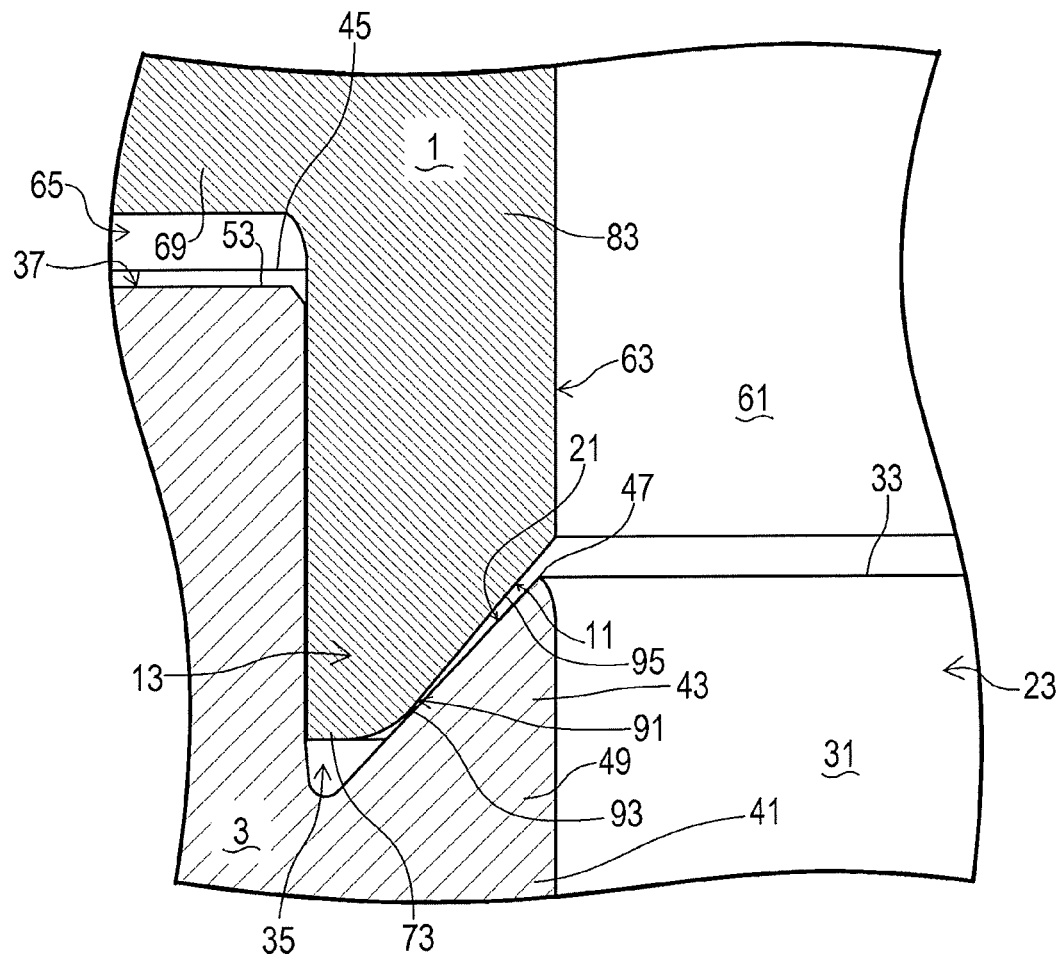
FIG. 5 shows the gasket of FIG. 3 at the moment when it is brought into contact with the fluid device of FIG. 3.
Figure 6:
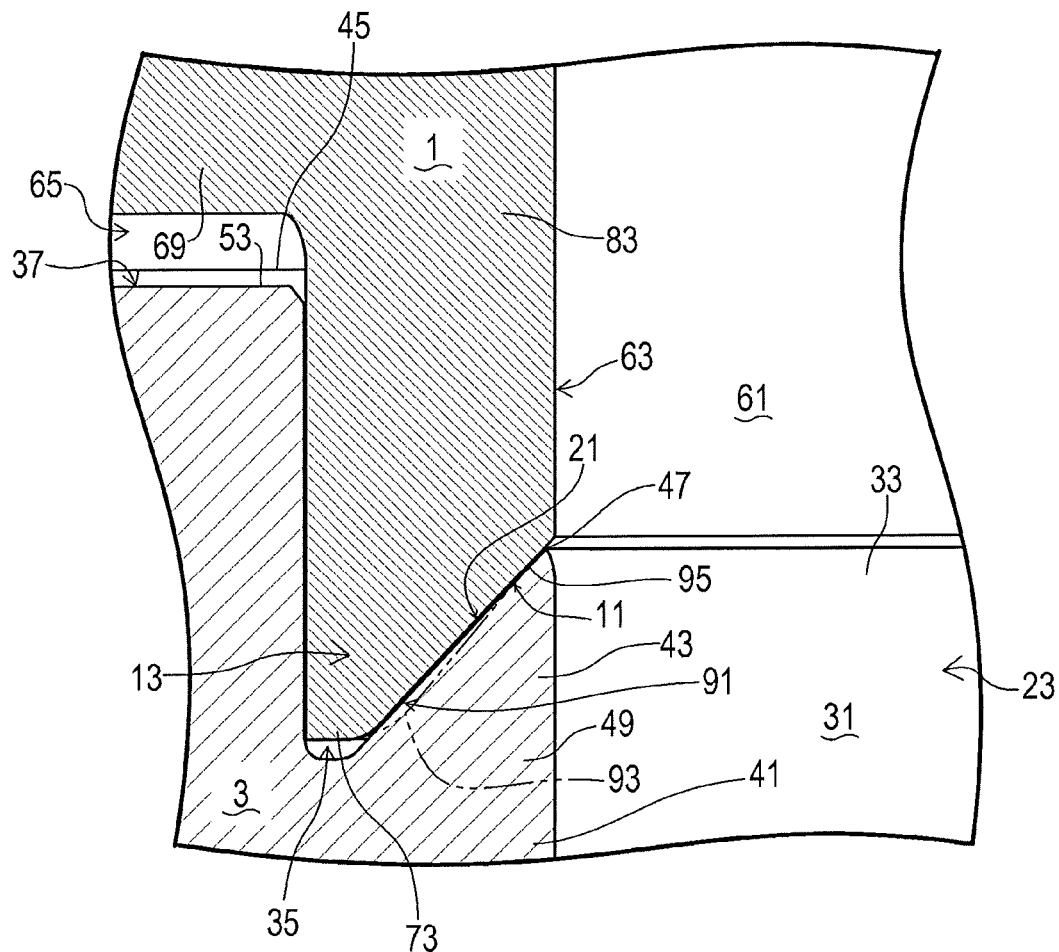
FIG. 6 shows the gasket of FIG. 3 after it completely contacts the fluid device of FIG. 3.

Next, a coupling means not shown in the figures couples the first fluid device 3 with the second fluid device 5. The fluid devices 3 and 5 are tightly pulled toward each other and squeezed. As shown in FIG. 5, the bulge 91 of the first slope 11 then contacts the second slope 21 in the order from the peak 93. The coupling means includes, but is not limited to, a hole, a nut, and a bolt. The hole is opened at one of the first fluid device 3 and the second fluid device 5. The nut is attached to the other of the fluid devices 3 and 5. The bolt passes through the hole and is screwed into the nut. Continuing to squeeze the fluid devices 3 and 5, the coupling means presses the bulge 91 against the second slope 21. Thus, the bulge 91 is firmly attached to the second slope 21. As shown in FIG. 6, the bulge 91 is squashed and tightly presses the second slope 21. Accordingly, the other parts 95 of the first slope 11 contact and press the second slope 21. The inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23.

When the gasket 1 is completely mounted on the fluid devices 3 and 5, the first slope 11 and the second slope 21 form a first sealing area in which a sealing force acts in an axial direction, and the convex 37 and the groove 65 form a second sealing area in which a sealing force acts in a radial direction.

The sealing areas only requires that at least the bulge 91 of the first slope 11 contacts the second slope 21. Thus, the gasket 1 and the first fluid device 3 can surely and easily seal the gap therebetween. This facilitates mounting of the gasket 1 on the first fluid device 3. Not only the entirety of the gap between the first slope 11 and the second slope 21 is sealed, but also the sealing pressure of the bulge 91 against the second slope 21 is higher than that of the other parts 95 of the first slope 11. This improves the sealing performance. The same is true for the second fluid device 5.

Figure 7:
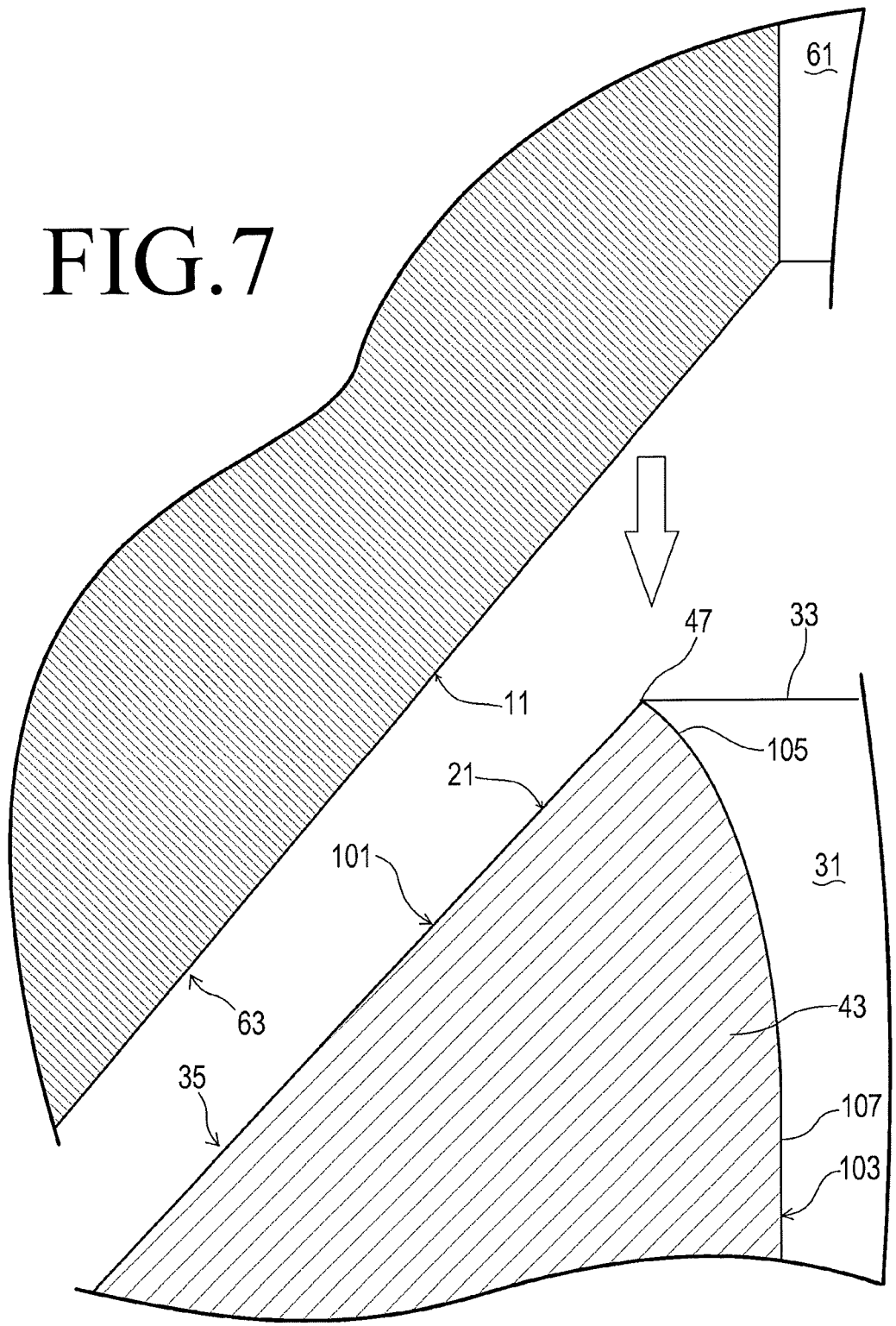
FIG. 7 is a partially enlarged view of FIG. 5.
Figure 8:
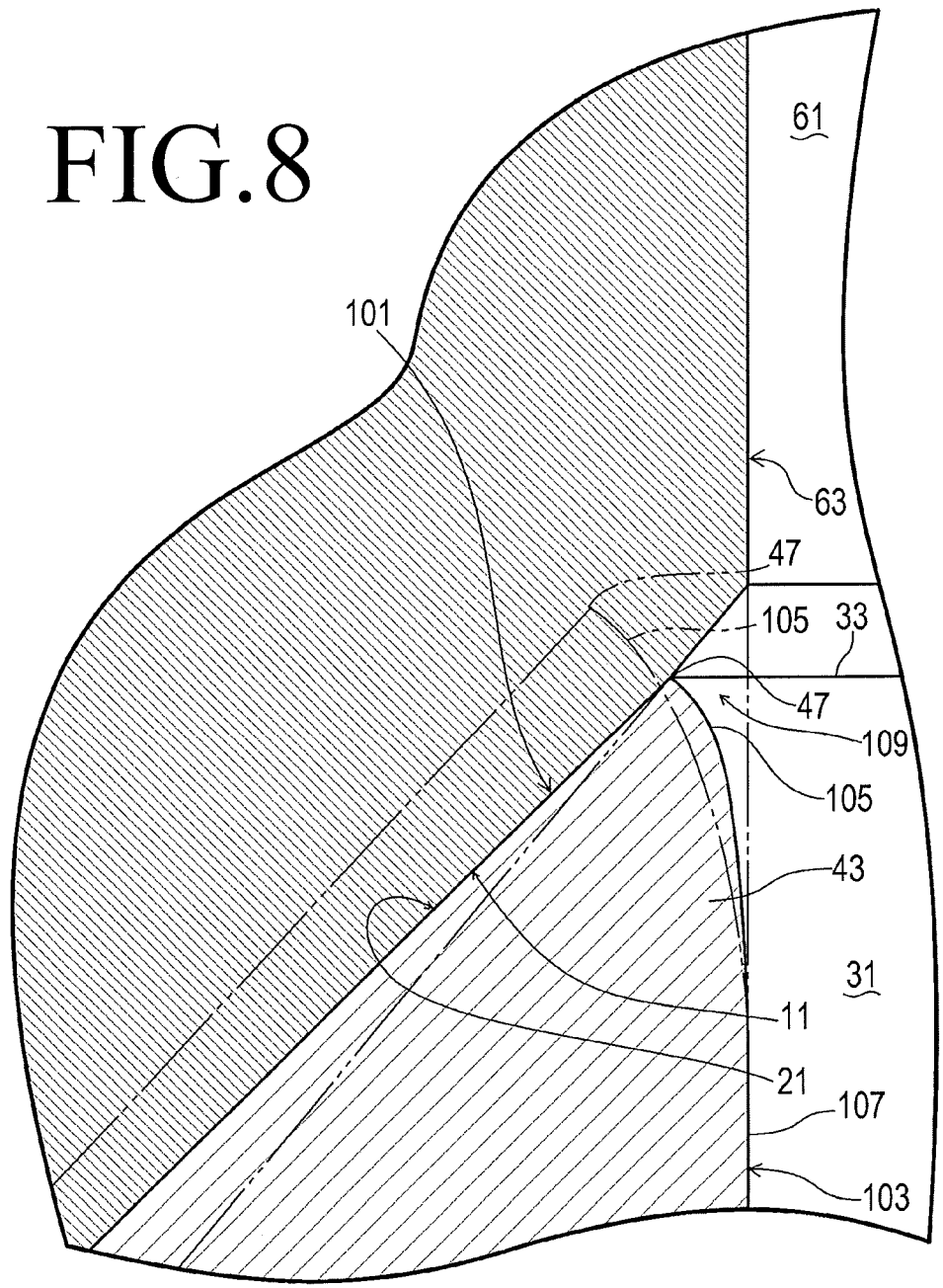
FIG. 8 is a partially enlarged view of FIG. 6.

As shown in FIGS. 5 and 6, the attached portion 23 of the first fluid device 3 includes the above-described annular protrusion 43 toward the gasket 1. As shown in FIGS. 7 and 8, the protrusion 43 has an outer periphery 101 with the second slope 21 and an inner periphery 103 facing the first fluid channel 31. The protrusion 43 has a shape tapering toward the gasket 1 under the condition that the inner periphery 103 has a curve convex to the radial inside of the attached portion 23. In other words, the protrusion 43 has a first inner circumferential surface 105 near the tip end 47 and a second inner circumferential surface 107 near the base end 49. The first inner circumferential surface 105 is located at the radial outside of the second inner circumferential surface 107. Parts of the protrusion 43 at larger distance from the base end 49 have larger inner diameters. The first inner circumferential surface 105 of the protrusion 43 has a profile in a cross section including the axis of the first fluid channel 31; The profile is a curve convex to the radial inside of the first fluid channel 31. The protrusion 43 thus positions the tip (upper) end 47 at the radial outside of the inner periphery 103.

When the second slope 21 contacts the first slope 11, the protrusion 43 is pressed by the first slope 11 radially inward. Then, a hollow 109 radially concave to the first fluid channel 31, appears adjacent to the protrusion 43 and the gasket 1 (cf. FIG. 8). The deformation of the protrusion 43 reduces the volume of the hollow 109 to be as small as possible. On the other hand, the deformation of the protrusion 43 is not so large that the protrusion 43 enters the inside of the first fluid channel 31 because of the rounded structure of the inner circumferential surfaces 105 and 107. The deformation of the protrusion 43 thus prevents fluid from remaining in the hollow 109 and enables fluid in the first fluid channel 31 to flow smoothly.

Figure 4:
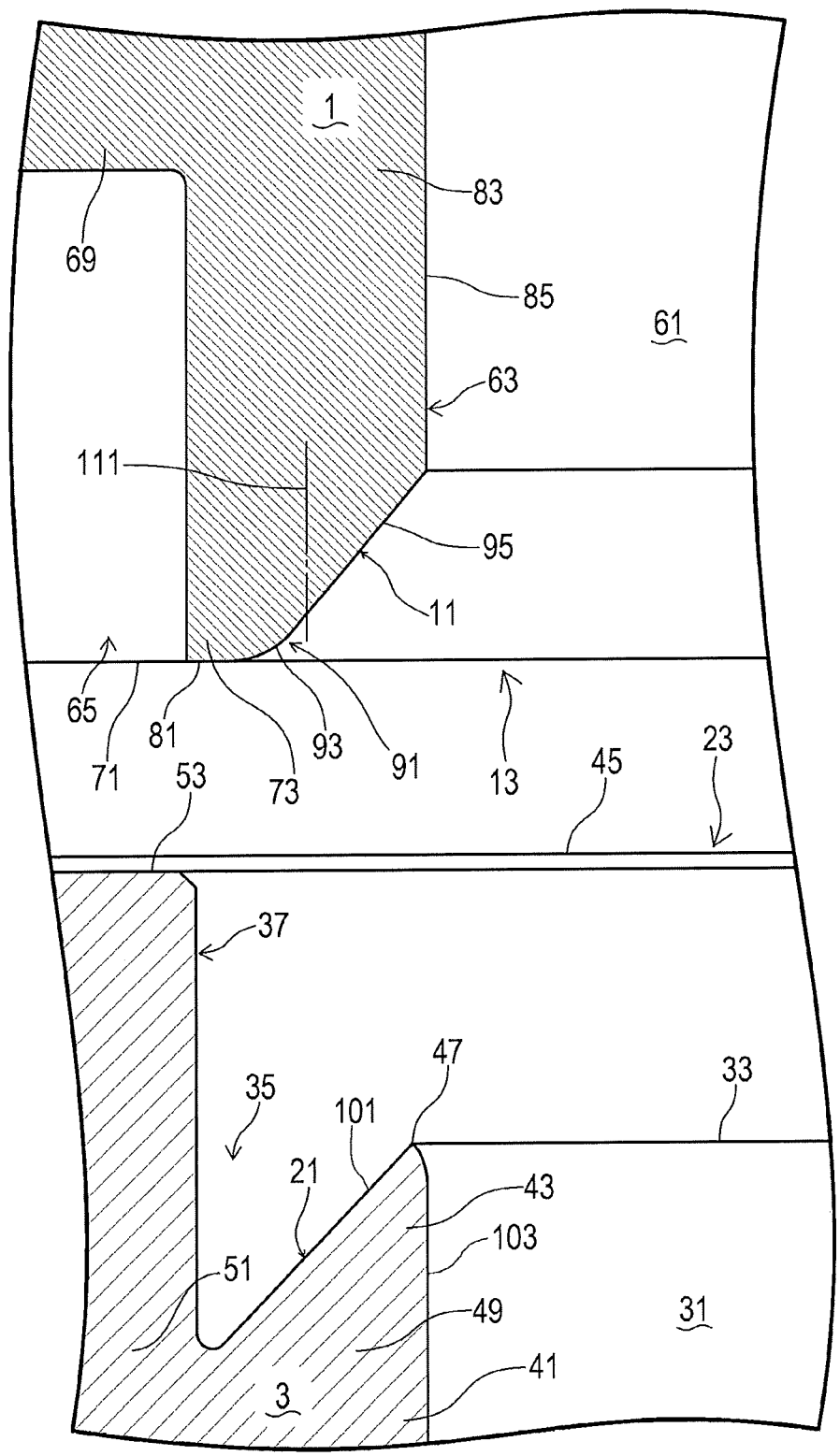
FIG. 4 is a partially enlarged view of FIG. 3.

As shown in FIG. 4, the bulge 91 of the first slope 11 is located at the radial outside of the radial center line 111 of the protrusion 43. Thus, the bulge 91 contacts a relatively thick part of the attached portion 23 when the first slope 11 and the second slope 21 form the first sealing area. This enables the bulge 91 and the second slope 21 to stably maintain the contact therebetween.

Figure 9:
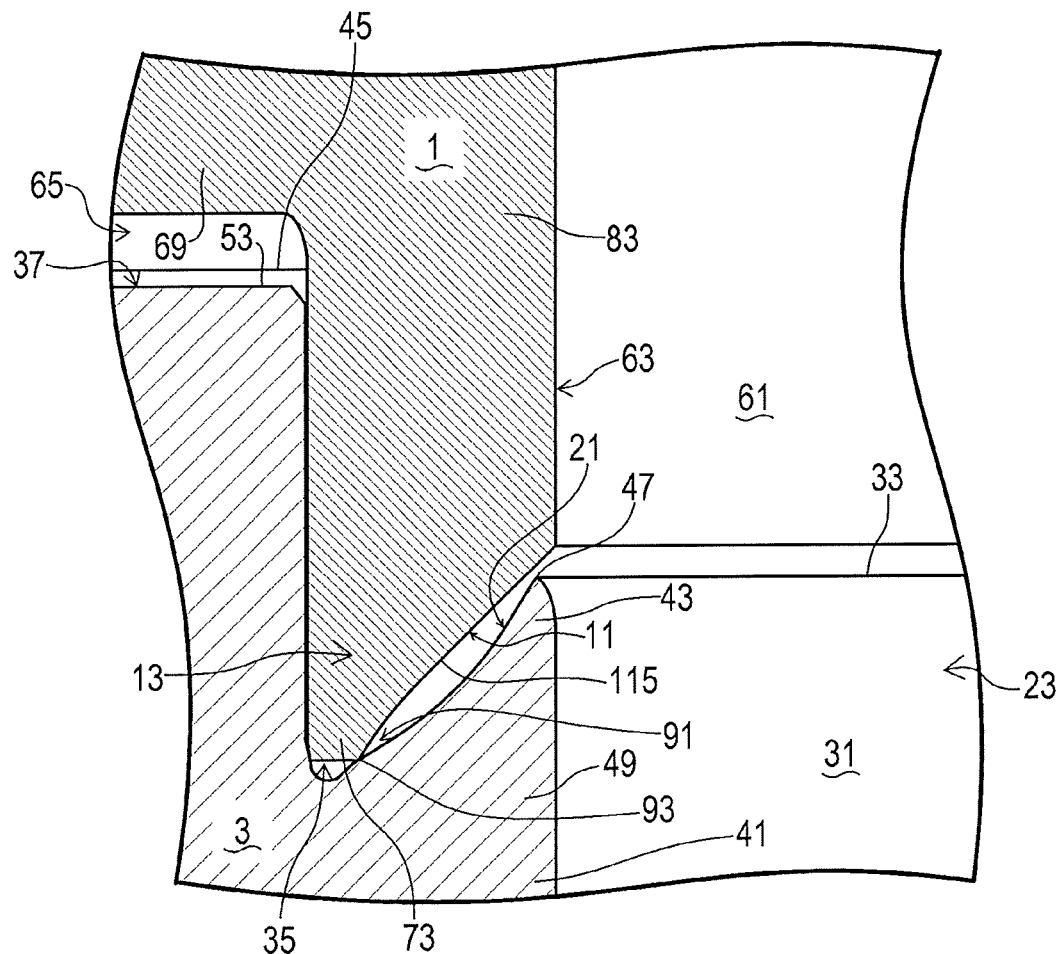
FIG. 9 shows a gasket-mounting structure of another embodiment of the invention at the moment when a gasket is brought into contact with a fluid device.
Figure 10:
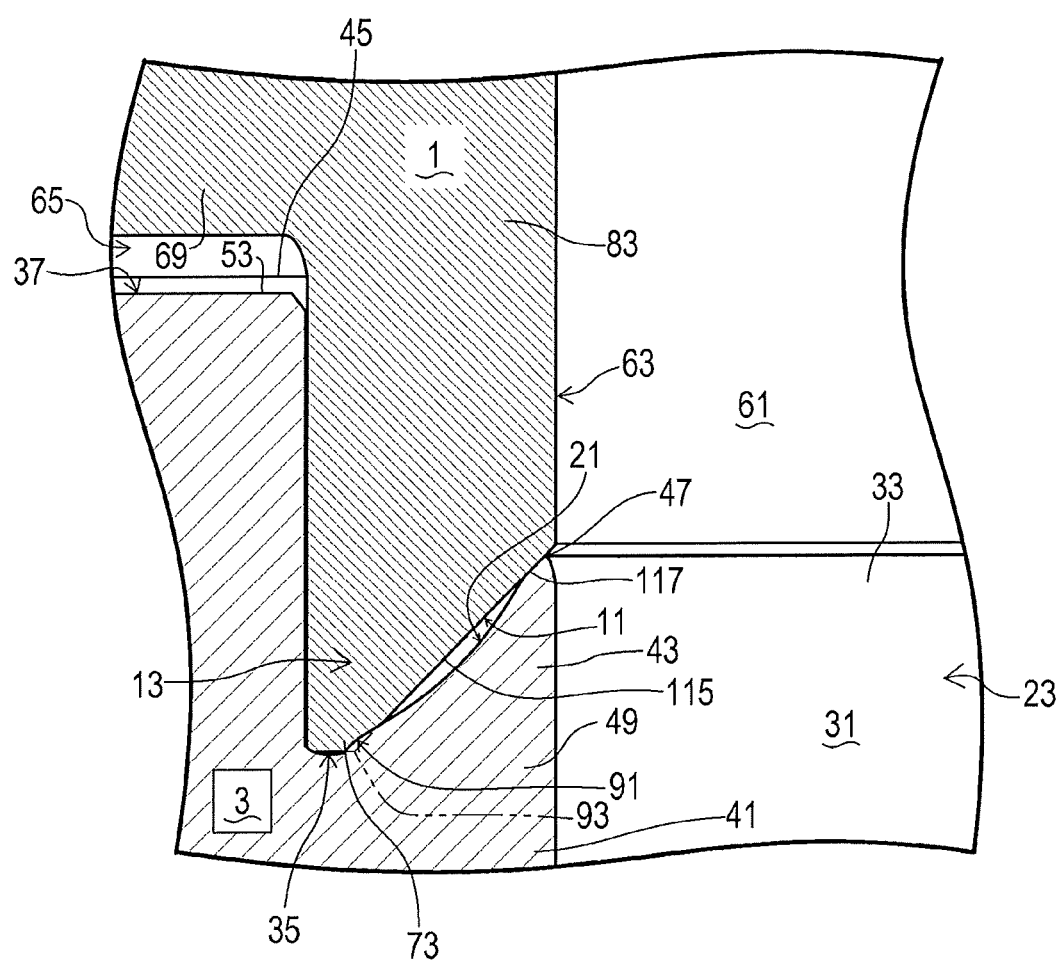
FIG. 10 shows the gasket-mounting structure of FIG. 9 after the gasket completely contacts the fluid device.

The first slope 11 allows the bulge 91 and the other parts 95 to contact and press the entirety of the second slope 21. Alternatively, the first slope 11 may allow only the bulge 91 and a part such as a contact area 117 to contact a part of the second slope 21, as shown in FIGS. 9 and 10. The bulge 91 is located at the first area near the tip end 73 of the inner protrusion 63, i.e. at a lower area of it. The contact area 117 is located at the second area near the base end 83 of the inner protrusion 63, i.e. an upper area of it. Due to the bulge 91 and the contact area 117, the second slope 21 has a (rounded) shape concave to the first slope 11.

A Second Embodiment of the Invention

Figure 11:
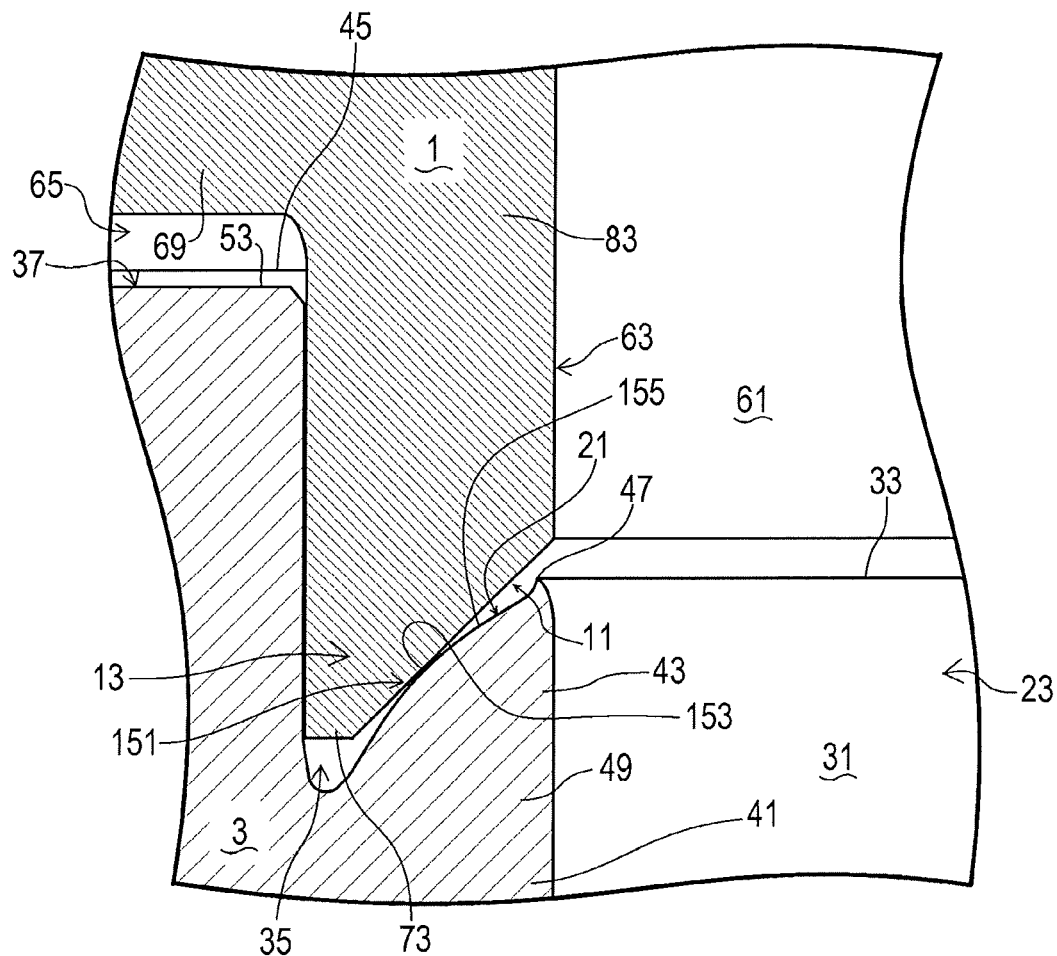
FIG. 11 shows a gasket-mounting structure of a second embodiment of the invention at the moment when a gasket is brought into contact with a fluid device.
Figure 12:
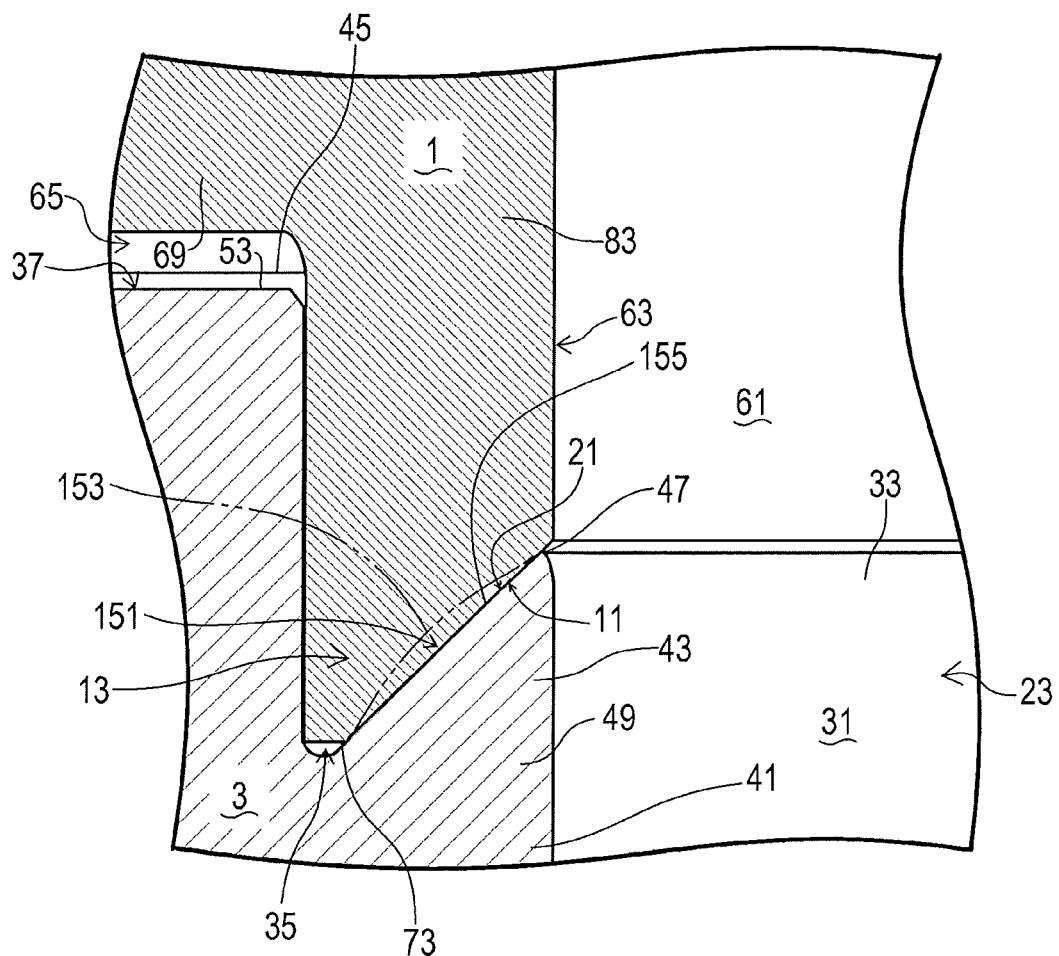
FIG. 12 shows the gasket-mounting structure of FIG. 11 after the gasket completely contacts the fluid device.

The second embodiment differs from the first embodiment in that the second slope 21 has an annular bulge 151 as shown in FIGS. 11 and 12, instead of the first slope 11 with the bulge 91. When the attaching portion 13 is mounted on the attached portion 23, the second slope 21 at least partially contacts the first slope 11 to seal the gap between the slopes 11 and 21.

The annular bulge 151 extends within the second slope 21 in a circumferential direction of (the protrusion 43 of) the attached portion 23. Due to the bulge 151, the second slope 21 has a (rounded) shape convex to the first slope 11. When the first slope 11 is brought into contact with the second slope 21, the bulge 151 is closer to the first slope 11 than other parts of the second slope 21 so that the peak 153 of the bulge 151 is the earliest contact portion with the first slope 11.

When the gasket 1 is being mounted on the first fluid device 3, i.e. it is being changed from the position separated from the first fluid device 3 to the position mounted on it (cf. FIG. 12), the attaching portion 13 on the first axial side of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Next, the above-described coupling means couples the first fluid device 3 with the second fluid device 5. The fluid devices 3 and 5 are tightly pulled toward each other and squeezed. As shown in FIG. 11, the bulge 151 of the second slope 21 then contacts the first slope 11 in the order from the peak 153. Continuing to squeeze the fluid devices 3 and 5, the coupling means presses the bulge 151 against the first slope 11. Thus, the bulge 151 is firmly attached to the first slope 11. As shown in FIG. 12, the bulge 151 is squashed and tightly presses the first slope 11. Accordingly, the other parts 155 of the second slope 21 contact and press the first slope 11.

The inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23.

When the gasket 1 is completely mounted on the fluid devices 3 and 5, the first slope 11 and the second slope 21 form a first sealing area in which a sealing force acts in an axial direction, and the convex 37 and the groove 65 form a second sealing area in which a sealing force acts in a radial direction.

The sealing areas only require that at least the bulge 151 of the second slope 21 contacts the first slope 11. Thus, the gasket 1 and the first fluid device 3 can surely and easily seal the gap therebetween. This facilitates mounting of the gasket 1 on the first fluid device 3. Not only the entirety of the gap between the first slope 11 and the second slope 21 is sealed, but also the sealing pressure of the bulge 151 against the first slope 11 is higher than that of the other parts 155 of the second slope 21. This improves the sealing performance. The same is true for the second fluid device 5.

The protrusion 43 in the second embodiment may have the same structure as that in the first embodiment. The slopes according to the invention, i.e. the first slope 11 and the second slope 21 in the above-described embodiments, may be straight slopes or curved slopes.

The above-described explanation teaches that the invention can obviously have variations and modifications. Accordingly, it should be understood that the invention can have embodiments other than those in the description within the scope of the claims attached to the description.

Supplement

Based on the above-described embodiments, the invention may be further characterized as follows:

In the structure according to the first aspect of the invention, the attached portion of the fluid device may include an annular protrusion extending toward the gasket. The protrusion may include an outer periphery with the second slope and an inner periphery facing a fluid channel. The protrusion may have a shape tapering toward the gasket so that the inner periphery has a curve convex to the radial inside of the attached portion, thus positioning a tip end of the protrusion at the radial outside of the inner periphery.

When the second slope contacts the first slope, the protrusion is pressed by the first slope radially inward. Then, a hollow radially concave to the fluid channel appears adjacent to the protrusion and the gasket. The deformation of the protrusion reduces the volume of the hollow to be as small as possible. On the other hand, the deformation of the protrusion is not so large that the protrusion enters the inside of the first fluid channel. The deformation of the protrusion thus prevents fluid from remaining in the hollow and enables fluid in the fluid channel to flow smoothly.

The bulge of the first slope may contact a base end of the protrusion. Thus, the bulge contacts a relatively thick part of the attached portion when the first slope and the second slope form the first sealing area. This enables the bulge and the second slope to stably maintain the contact therebetween.

The sealing area only requires that at least the bulge of the first slope contacts the second slope. Thus, the gasket and the fluid device can surely and easily seal the gap therebetween. This facilitates mounting of the gasket on the fluid device.

In the structure according to the second aspect of the invention, the attached portion of the fluid device may include an annular protrusion extending toward the gasket. The protrusion may include an outer periphery with the second slope and an inner periphery facing a fluid channel. The protrusion may have a shape tapering toward the gasket under the condition that the inner periphery has a curve convex to the radial inside of the attached portion, thus positioning a tip end of the protrusion at the radial outside of the inner periphery.

When the second slope contacts the first slope, the protrusion is pressed by the first slope radially inward. Then, a hollow radially concave to the fluid channel appears adjacent to the protrusion and the gasket. The deformation of the protrusion reduces the volume of the hollow to be as small as possible. On the other hand, the deformation of the protrusion is not so large that the protrusion enters the inside of the first fluid channel. The deformation of the protrusion thus prevents fluid from remaining in the hollow and enables fluid in the fluid channel to flow smoothly.

What is claimed is:

1. A structure allowing a gasket to be mounted on a fluid device, comprising:
    the gasket including an annular attaching portion that has a first slope at an axial end; and
    the fluid device including an annular attached portion with a second slope that contacts the first slope; wherein
    the first slope at least partially includes a contact area that contacts the second slope to seal a gap between the first slope and the second slope;
    the contact area has an annular bulge protruding toward the second slope in contrast to other portions of the first slope so that the bulge is the earliest contact portion with the second slope when the contact area is brought into contact with the second slope;
    the attached portion of the fluid device comprises an annular protrusion extending toward the gasket;
    the protrusion includes an outer periphery with the second slope and an inner periphery facing a fluid channel;
    the protrusion has a tapering shape that tapers toward the gasket so that the inner periphery has a curve convex to the radial inside of the attached portion, thus positioning a tip end of the protrusion at the radial outside of the inner periphery: and
    when the second slope contacts the first slope, the tapering shape of the protrusion form a hollow adjacent to the inner periphery of the protrusion and to the gasket.

2. The structure according to claim 1, wherein the bulge of the first slope contacts a base end of the protrusion.

3. A structure allowing a gasket to be mounted on a fluid device, comprising:
    the gasket including an annular attaching portion that has a first slope at an axial end; and
    the fluid device including an annular attached portion with a second slope that contacts the first slope; wherein
    the second slope at least partially includes a contact area that contacts the first slope to seal a gap between the first slope and the second slope;
    the contact area has an annular bulge protruding toward the first slope in contrast to other portions of the second slope so that the bulge is the earliest contact portion with the first slope when the contact area is brought into contact with the first slope;
    the attached portion of the fluid device comprises an annular protrusion extending toward the gasket:
    the protrusion includes an outer periphery with the second slope and an inner periphery facing a fluid channel,
    the protrusion has a tapering shape that tapers toward the gasket under the condition that the inner periphery has a curve convex to the radial inside of the attached portion, thus positioning a tip end of the protrusion at the radial outside of the inner periphery; and
    when the second slope contacts the first slope, the tapering shape of the protrusion form a hollow adjacent to the inner periphery of the protrusion and to the gasket.

\* \* \* \* \*